(12) United States Patent
Ball et al.

(10) Patent No.: US 9,960,430 B2
(45) Date of Patent: May 1, 2018

(54) TERNARY PLATINUM ALLOY CATALYST

(75) Inventors: Sarah Ball, Cholsey (GB); Thomas Robertson Ralph, Chippenham (GB); Brian Ronald Theobald, Reading (GB); David Thompsett, Reading (GB)

(73) Assignee: JOHNSON MATTHEY FUEL CELLS LIMITED, London (GB)

( * ) Notice: Subject to any disclaimer, the term of this patent is extended or adjusted under 35 U.S.C. 154(b) by 552 days.

(21) Appl. No.: 13/148,792

(22) PCT Filed: Feb. 3, 2010

(86) PCT No.: PCT/GB2010/050164
§ 371 (c)(1),
(2), (4) Date: Nov. 10, 2011

(87) PCT Pub. No.: WO2010/092369
PCT Pub. Date: Aug. 19, 2010

(65) Prior Publication Data
US 2012/0046161 A1  Feb. 23, 2012

(30) Foreign Application Priority Data
Feb. 11, 2009 (GB) .................. 0902231.0

(51) Int. Cl.
| *H01M 4/92* | (2006.01) |
| *C22C 1/00* | (2006.01) |
| *C22C 5/04* | (2006.01) |
| *C22F 1/14* | (2006.01) |
| *H01M 8/086* | (2016.01) |
| *H01M 8/1018* | (2016.01) |

(52) U.S. Cl.
CPC ............ *H01M 4/921* (2013.01); *C22C 1/002* (2013.01); *C22C 5/04* (2013.01); *C22F 1/14* (2013.01); *H01M 4/926* (2013.01); *H01M 8/086* (2013.01); *H01M 2008/1095* (2013.01)

(58) Field of Classification Search
None
See application file for complete search history.

(56) References Cited

U.S. PATENT DOCUMENTS

| 4,175,055 A | 11/1979 | Goller et al. |
| 4,185,131 A | 1/1980 | Goller et al. |
| 4,316,944 A | 2/1982 | Landsman et al. |
| 4,447,506 A | 5/1984 | Luczak et al. |
| 4,806,515 A | 2/1989 | Luczak et al. |
| 5,013,618 A | 5/1991 | Luczak |
| 5,068,161 A * | 11/1991 | Keck et al. ............ 429/500 |
| 7,318,977 B2 | 1/2008 | He et al. |
| 8,211,825 B2 | 7/2012 | Mei et al. |
| 2007/0099066 A1 | 5/2007 | Okumura et al. |
| 2007/0160897 A1 | 7/2007 | He et al. |
| 2007/0160899 A1* | 7/2007 | Atanassova et al. ........ 429/44 |
| 2008/0199762 A1* | 8/2008 | Hayden et al. ............ 429/41 |
| 2008/0233465 A1* | 9/2008 | Mizutani ............ B01J 23/6486 429/431 |
| 2009/0247401 A1 | 10/2009 | Mei et al. |
| 2012/0046161 A1 | 2/2012 | Ball et al. |

FOREIGN PATENT DOCUMENTS

| EP | 0 450 849 A2 | 10/1991 |
| EP | 0 535 314 A1 | 4/1993 |
| EP | 0 557 674 A1 | 9/1993 |
| JP | S63-11647 | * 1/1988 |
| JP | S6311647 A | 1/1988 |
| JP | 06-132034 | * 5/1994 |
| JP | 6-132034 A | 5/1994 |
| JP | 0757312 A | 3/1995 |
| JP | 2009-35750 A | 2/2009 |
| JP | 2009238510 | 10/2009 |
| JP | 2012517341 | 8/2012 |
| WO | WO-94/10715 A1 | 5/1994 |
| WO | WO-2005/001967 A1 | 1/2005 |
| WO | WO2006/021740 | * 3/2006 |
| WO | WO-2006/021740 A1 | 3/2006 |
| WO | WO2007/067546 | * 6/2007 |
| WO | WO-2007/067546 A2 | 6/2007 |
| WO | 2007100375 A2 | 9/2007 |
| WO | 2009118929 | 10/2009 |
| WO | 2010092369 | 8/2010 |

OTHER PUBLICATIONS

Ball et al., "An investigation into factors affecting the stability of carbons and carbon supported platinum and platinum/cobalt alloy catalysts during 1.2 V potentiostatic hold regimes at a range of temperatures," *Journal of Power Sources* 171 (2007), pp. 18-25.
Puhakka et al., "Comparison of Modeling and Experimental Results of Modified Pt-Based PEMFC Cathode-Catalysts," *Electrochemical Society Proceedings*, vol. 2002-31, pp. 74-88 (2002).
Papageorgopoulos et al., "The inclusion of Mo, Nb and Ta in Pt and PtRu carbon supported 3electrocatalysts in the quest for improved CO tolerant PEMFC anodes," *Electrochimica Acta* 48 (2002), pp. 197-204.
International Search Report from PCT International Application No. PCT/GB2010/050164, dated May 3, 2010.
British Search Report from British Patent Application No. 0902231.0, dated May 27, 2009.
G. Couturier et al., "Electrocatalysis of the Hydrogen Oxidation and of the Oxygen Reduction Reactions on Pt and Some Alloys in Alkaline Medium", Electrochimica Acta, vol. 32, No. 7, pp. 995-1005 (1987).

(Continued)

*Primary Examiner* — Melvin C Mayes
*Assistant Examiner* — Colette Nguyen
(74) *Attorney, Agent, or Firm* — Young & Thompson

(57) ABSTRACT

A platinum alloy catalyst PtXY, wherein X is nickel, cobalt, chromium, copper, titanium or manganese and Y is tantalum or niobium, characterised in that in the alloy the atomic percentage of platinum is 46-75 at %, of X is 1-49 at % and of Y is 1-35 at %; provided that the alloy is not 66 at % Pt20 at % Cr14 at % Ta or 50 at % Pt, 25 at % Co, 25 at % Ta is disclosed. The catalyst has particular use as an oxygen reduction catalyst in fuel cells, and in particular in phosphoric acid fuel cells.

11 Claims, No Drawings

(56) References Cited

OTHER PUBLICATIONS

Japanese Office Action dated May 13, 2016, in corresponding Japan Application 2015-158457, Engish translation provided.
He et al., "Combinatorial screening of PtTiMe ternary alloys for oxygen electroreduction", Physical Chemistry Chemical Physics, Owner Societites Journal 2008, vol. 10, pp. 3731-3738, Honda Research Institute, Columbus, Ohio, USA.

* cited by examiner

TERNARY PLATINUM ALLOY CATALYST

CROSS-REFERENCE TO RELATED APPLICATIONS

This application is the U.S. National Phase application of PCT International Application No. PCT/GB2010/050164, filed Feb. 3, 2010, and claims priority of British Patent Application No. 0902231.0, filed Feb. 11, 2009, the disclosures of both of which are incorporated herein by reference in their entirety for all purposes.

FIELD OF THE INVENTION

The present invention relates to a novel ternary platinum alloy catalyst, and to the use of the catalyst, particularly as an oxygen reduction catalyst in fuel cells, such as a phosphoric acid fuel cell (PAFC) or a proton exchange membrane fuel cell (PEMFC).

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Electrocatalysts for fuel oxidation and oxygen reduction are typically based on platinum or platinum alloyed with one or more other metals. The platinum or platinum alloy catalyst can be in the form of unsupported nanometre sized particles (metal blacks) or can be deposited as even higher surface area particles onto a conductive carbon substrate (a supported catalyst).

Fuel cells are usually classified according to the nature of the electrolyte employed. In the PAFC, cells are fabricated from a phosphoric acid electrolyte contained in a thin inert matrix layer sandwiched between the anode and cathode electrodes. In the PEMFC, the electrolyte layer is typically a thin proton-conducting polymer located between the electrode layers. Either of these cells can operate on pure hydrogen fuel, or a more dilute hydrogen containing fuel mixture formed by the reforming of a hydrocarbon fuel, or particularly in the case of the PEMFC, can operate directly on hydrocarbon fuels such as methanol or ethanol.

The electrodes of the PAFC and PEMFC, often referred to as gas diffusion electrodes (GDE), usually comprise a gas-porous, electrically conductive and chemically inert gas diffusion substrate (GDS) and an electrocatalyst layer, comprising the electrocatalyst, which is facing, and in contact with, the electrolyte or membrane. Phosphoric acid fuel cells use phosphoric acid as the electrolyte and typically operate at a temperature of between 150° C. and 220° C. Within the research published or patented in the relevant area, alloying platinum with transition metals such as chromium, cobalt and nickel can boost the catalyst activity for the oxygen reduction reaction by a factor of 2 or 3 over platinum catalysts in PAFC systems. Conventional catalysts employed at the cathode of phosphoric acid fuel cells are platinum-chromium (U.S. Pat. No. 4,316,944), platinum-nickel (U.S. Pat. No. 5,068,161) and platinum-cobalt-chromium (U.S. Pat. No. 4,447,506) A problem associated with such catalysts is a lack of stability due to sintering of the catalyst at the temperatures used in phosphoric acid fuel cells. Catalyst particles have a tendency to coalesce either by surface migration or dissolution/reprecipitation during prolonged operation in the phosphoric acid fuel cell environment. This leads to an unacceptable reduction in cell performance (voltage) over the lifetime of the fuel cell system and a concomitant reduction in the efficiency of the fuel cell's electrical generating capability. Therefore the search continues for oxygen reduction catalysts with higher activity and stability. Ternary systems have been shown to be more stable over binary compositions and the stability in a phosphoric acid fuel cell environment can be improved by the addition of a third metal. U.S. Pat. No. 4,806,515 describes a ternary system of platinum-chromium-gallium with substantial stability over sintering and resistance to metal dissolution. Platinum-cobalt-chromium (U.S. Pat. No. 5,068,161) and platinum-rhodium-iron (WO94/10715) have also demonstrated some enhancement of stability in the phosphoric acid fuel cell environment as have platinum-iridium-chromium and platinum-iridium-iron (U.S. Pat. No. 5,013,618).

SUMMARY OF THE INVENTION

It is the object of the present invention to provide an improved catalyst, showing either improved lifetime stability with no reduction in activity compared to state of the art catalysts, or improved activity whilst maintaining state of the art levels of stability, or preferably a combination of both improved stability and activity, particularly for use as the oxygen reduction catalyst in phosphoric acid fuel cells.

DETAILED DESCRIPTION OF THE INVENTION

Accordingly, the present invention provides a platinum alloy catalyst PtXY, wherein X is nickel, cobalt, chromium, copper, titanium or manganese and Y is tantalum or niobium, characterised in that in the alloy the atomic percentage of platinum is 46-75 at %, of X is 1-49 at % and of Y is 1-35 at %; provided that the alloy is not 66 at % Pt20 at % Cr14 at % Ta or 50 at % Pt25 at % Co25 at % Ta.

Suitably X is nickel, cobalt, chromium or copper; preferably nickel or cobalt.

In one embodiment of the invention, there is provided a PtXTa alloy, wherein X is nickel, cobalt, chromium, copper, titanium or manganese, characterised in that the percentage of platinum is 46-75 at %, of Ta is 1-35 at % and of X is 1-49 at %; provided that the alloy is not 66 at % Pt20 at % Cr14 at % Ta or 50 at % Pt25 at % Co25 at % Ta.

In a second embodiment of the invention, there is provided a PtXNb alloy, wherein X is nickel, cobalt, chromium, copper, titanium or manganese, characterised in that the percentage of platinum is 46-75 at %, of Nb is 1-35 at % and of X is 1-49 at %.

Suitably, the atomic percent of platinum in the alloy is from 46 to 65 at %, more suitably from 46 to 60 at %, preferably from 46 to 55 at %.

Suitably, the atomic percent of X in the alloy is from 5 to 45 at %, more suitably from 10 to 40 at %, preferably from 15 to 40 at %, more preferably 25-40 at %.

Suitably, the atomic percent of Y in the alloy is from 1 to 25 at %, more suitably from 1 to 20 at %, preferably from 5 to 20 at %.

In the present context, "at %" means atomic percentage, i.e. the percentage based on atoms or moles of the total of Pt, X and Y; any additional non-metallic components (e.g. carbon) are not taken into consideration. By the term 'alloy' we mean that there is at least some interaction and incorporation of the X and Y metals into the Pt lattice, but the incorporation (particularly of the Y metal) is not necessarily uniform throughout the whole alloy particle.

The atomic percent of the metal in the alloy may be determined by standard procedures known to those skilled in the art; for example by wet chemical analysis digestion of the sample followed by inductively coupled plasma (ICP) emission spectroscopy.

The catalyst of the invention can be used in a fuel cell as an unsupported catalyst (i.e. as a metal black) or as a supported catalyst (i.e. dispersed on a support material); preferably the catalyst of the invention is used as a supported catalyst. Suitably the amount of the PtXY alloy is 5-80wt % based on the total weight of the supported catalyst, preferably 20-80wt %. In a supported catalyst according to the present invention the PtXY alloy is suitably dispersed on a conductive support material, for example a conductive carbon, such as an oil furnace black, extra-conductive black, acetylene black or heat-treated and graphitised versions thereof. The catalyst of the invention preferably consists essentially of the PtXY alloy dispersed on a conductive carbon material. Exemplary carbons include Akzo Nobel Ketjen EC300J, Cabot Vulcan XC72R and graphitised XC72R and Denka Acetylene Black. In one embodiment, the carbon support is a corrosion resistant carbon support. By 'corrosion resistant' we mean that the carbon material is at least 20 times more corrosion resistant than a high surface area carbon such as Akzo Nobel Ketjen EC300J and at least 10 times more corrosion resistant than Cabot Vulcan XC72R, wherein the carbon corrosion rate is determined during a potentiostatic hold test at high potential (>1V vs RHE) in an electrochemical cell. Measurement of corrosion current or rate of carbon dioxide evolution as a product of the carbon corrosion reaction can be monitored and converted to a carbon weight loss for the purposes of comparing different carbon types. Such procedures and results for different carbon types are described in J. Power Sources 171, (2007), 18-25 and references therein.

The invention further provides a method for the manufacture of the catalyst of the invention. The catalyst of the invention may be prepared by dispersing a carbon support in water to form a slurry, and adding to this slurry, a dissolved platinum salt. A salt of component Y is dissolved in concentrated acid and added to a solution of a salt of component X. The solution containing X and Y is added to the platinum/carbon suspension. The catalyst is recovered by filtration, washed and dried. Catalyst samples are then annealed at high temperature in an inert (e.g. $N_2$) atmosphere. Alternative methods for making the catalysts will be known to the skilled person. These include using a similar method but employing alternative platinum and base metal precursors that are soluble in hot aqueous solution. Other alkalis can be used to precipitate the metals onto the carbon support. Variations in the order of the deposition of the metals can be employed or all can be deposited simultaneously. Alternative preparations also include the incipient wetness method where the metal salts are adsorbed into the carbon support using either aqueous or organic solutions of the metal salts and the solvent removed. Yet another method is to start with a commercially available carbon supported platinum catalyst and deposit the base metals by one or other of the methods above. To form the final catalyst the materials isolated after deposition of the metals must be reduced and alloyed. This can be achieved by use of the carbothermal process where the unreduced precursor is heated in an inert atmosphere to such temperatures that reduction and alloying occurs. This step can also be carried out in a reducing (e.g. 5% $H_2$ in $N_2$) atmosphere. The methods used to prepare metal nanoparticles can also be employed. In this case the metal salts are reduced by an appropriate reducing agent such as borohydride in the presence of a surfactant and the resulting nanoparticles are adsorbed onto the carbon support.

The catalyst materials of the invention have particular utility as the active component in an electrode, in particular the oxygen reduction electrode (gas diffusion electrode) of an acid electrolyte fuel cell, such as the PAFC or PEMFC. In a further aspect the present invention provides an electrode comprising a catalyst according to the invention. In a preferred embodiment, the electrode is the cathode. The catalyst may be unsupported or deposited on an electronically conducting support. The catalyst can be deposited onto a porous gas diffusion substrate (GDS) using a range of well-established techniques. For PAFC electrodes the catalyst is usually mixed with an aqueous suspension of a hydrophobic fluoropolymer such as polytetrafluoroethylene (PTFE), to act as a polymeric binder, and the resultant flocculated material applied to the GDS by techniques such as direct filtration, filter transfer, screen printing (as described in e.g. U.S. Pat. No. 4,185,131) or dry powder vacuum deposition (as described in U.S. Pat. No. 4,175,055). For PEMFC applications the catalyst may also be formulated into an ink, comprising an aqueous and/or organic solvent, and a solution form of a proton-conducting polymer. The ink may be deposited onto the substrate using techniques such as spraying, printing and doctor blade methods.

Typical gas diffusion substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc, or woven carbon cloths. The carbon paper, web or cloth may be provided with a further treatment prior to being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

In a further embodiment of the invention, the catalyst of the invention is applied to a decal transfer substrate. Accordingly, a further aspect of the present invention provides a decal transfer substrate comprising a catalyst of the invention. The transfer substrate may be any suitable transfer substrate known to those skilled in the art but is preferably a polymeric material such as polytetrafluoroethylene (PTFE) or polypropylene (especially biaxially-oriented polypropylene, BOPP) or a polymer-coated paper such as polyurethane coated paper. The transfer substrate could also be a silicone release paper or a metal foil such as aluminium foil. The catalyst of the invention may then be transferred to a gas diffusion substrate, or in the case of application for PEMFC, to the proton-conducting membrane to form a catalyst coated membrane (CCM), by techniques known to those skilled in the art. Accordingly, a further aspect of the invention provides a catalyst coated membrane comprising a catalyst of the invention.

The electrode of the invention may be used directly in a fuel cell, for example a phosphoric acid fuel cell wherein the electrolyte is liquid phosphoric acid in a supporting matrix, for example silicon carbide. Accordingly, a further aspect of the invention provides a fuel cell, in particular a phosphoric acid fuel cell, which comprises an electrode of the invention. Such fuel cells may be operated in the range of from 150° C. to 220° C.

Although the catalyst of the invention has particular application in phosphoric acid fuel cells, and is described herein in detail with reference to this use, the catalyst has use in other fuel cells or for other applications. In particular, the catalyst of the invention may also be used in proton exchange membrane fuel cells (PEMFC), polybenzimidazole (PBI)-doped fuel cells, direct methanol fuel cells (DMFC) and alkaline electrolyte fuel cells (AFC).

The invention will now be further described with reference to the following figures, which are illustrative and not limiting of the invention.

General Preparation Route

All catalysts were prepared at a 20 g scale to target a 15% Pt loading by weight on the carbon support.

Carbon black was dispersed in water using a shear mixer and transferred to a reaction vessel fitted with temperature and pH probes. Pt salt (e.g. $K_2PtCl_4$) was dissolved in water. This solution was pumped into the stirred carbon slurry and NaOH added dropwise to maintain the pH at 7.0. $TaCl_5$ or $NbCl_5$ was dissolved in concentrated HCl and then added to $NiCl_2$ or $CoCl_2$ solution as appropriate. The solution containing base metals was then added to the Pt/C suspension and the oxides/hydroxides deposited whilst maintaining the pH at 7. Complete deposition of all metals was achieved. The catalyst was recovered by filtration and washed on the filter bed. The material was dried and then annealed at high temperature (1000 and 1200° C.) in an inert ($N_2$) atmosphere. Final analysis was carried out by wet chemical digestion of samples and ICP-MS on the resultant metal solutions to determine metal assay. The degree of sample uniformity and alloying was assessed using X-Ray Diffraction (XRD) analysis. The catalysts shown in Table 1 were made by the above general preparation route.

TABLE 1

| Example No. | Pt (atomic %) | X (atomic %) | Y (atomic %) |
| --- | --- | --- | --- |
| 1 | Pt (54%) | Ni (40%) | Ta (6%) |
| 2 | Pt (50%) | Ni (15%) | Ta (35%) |
| 3 | Pt (55%) | Ni (28%) | Nb (17%) |
| 4 | Pt (58%) | Co (24%) | Ta (18%) |
| 5 | Pt (70%) | Ni (23%) | Nb (7%) |
| 6 | Pt (52%) | Ni (14%) | Nb (24%) |

COMPARATIVE EXAMPLE 1

PtCoCr (50:30:20) Catalyst

A state-of-the-art PtCoCr catalyst was prepared as described in Example 6 of U.S. Pat. No. 5,068,161 by hydrolysis of the chloride salts of Co, Cr and Pt to give a 15 wt % Pt loading. Final analysis (% by weight): 15.8% Pt/2.01% Co/1.03% Cr (atomic % 58:24:18)

Determination of Activity and Stability of Electrocatalyst Materials

Electrochemical surface area (ECA) and mass activity of catalysts of the invention were measured as described in U.S. Pat. No. 5,068,161. Briefly, cyclic voltammetry measurements were performed in dilute acid at room temperature, using a 3 electrode cell and fully wetted electrodes, and the charge associated with hydrogen absorption determined and converted to $m^2$/gPt using a correction factor of 210 μC per $cm^2$ Pt. Activity was measured using a gas-fed half cell using oxygen as reactant, at 180° C. in 99% phosphoric acid electrolyte, with activity expressed as current per weight of Pt (A/mgPt) at 900 mV as is commonly practiced in the art. Electrodes were prepared by mixing of the catalyst with PTFE, application to wet proofed carbon paper and sintering.

Catalyst stability was determined by exposing wetted electrodes to a voltage of 0.7V for 50 hr at 230° C. in 99% $H_3PO_4$ and measuring the change in electrochemical surface area after the ageing test. Catalyst sintering is a common cause of performance decay in PAFC systems and the decay mechanism is accelerated by temperature, thus the increased temperature of the ageing test resulted in a more rapid decay in ECA compared to usual PAFC operating conditions.

Table 2 shows catalyst ECA, mass activity and stability of catalysts of the invention compared to the state-of-the-art Comparative Example 1 demonstrating that selected materials show enhanced stability over Comparative Example 1 at equivalent activity or improved activity values at comparable stability levels.

In addition, the catalysts of the invention have higher initial surface areas (ECA) than Comparative Example 1, but show comparable or improved stability. Increasing and maintaining surface area during ageing compared to existing materials represents an advantage in operational PAFC systems.

TABLE 2

Electrochemical Surface Area (ECA), catalyst mass activity and stability % ECA lost during the ageing test.

| Example No. | ECA ($m^2$/g Pt) | Mass Activity (mA/mg Pt) | % ECA loss (50 hrs, 0.7 V, 230° C.) |
| --- | --- | --- | --- |
| Comparative Example 1 | 55 | 50 | 45% |
| 4 | 83 | 61 | 50% |
| 5 | 67 | 52 | 35% |
| 6 | 60 | 45 | 35% |

The invention claimed is:

1. A ternary platinum alloy catalyst PtXY, wherein X is nickel and Y is tantalum, and wherein in the alloy the atomic percentage of platinum is 46-75 at %, of X is 25-40 at % and of Y is 1-20 at %.

2. The ternary platinum alloy catalyst according to claim 1, wherein the catalyst is unsupported or supported on a dispersed support material.

3. The ternary platinum alloy catalyst according to claim 2, wherein the catalyst is supported on a dispersed support material.

4. The ternary platinum alloy catalyst according to claim 3, wherein the support material is a corrosion resistant carbon.

5. An electrode comprising a catalyst according to claim 1.

6. The electrode according to claim 5, wherein the electrode is a cathode.

7. A fuel cell comprising an electrode according to claim 5.

8. The fuel cell according to claim 7, wherein the fuel cell is a phosphoric acid fuel cell.

9. A catalyst coated membrane comprising a catalyst according to claim 1.

10. A fuel cell comprising a catalyst coated membrane according to claim 9.

11. The fuel cell according to claim 10, wherein the fuel cell is a proton exchange membrane fuel cell.

* * * * *